(12) United States Patent
Petersen

(10) Patent No.: US 8,177,907 B2
(45) Date of Patent: May 15, 2012

(54) USE OF PULVERIZED GLASS IN A COMPOSITE MATERIAL

(76) Inventor: Lars Børthy Petersen, Randers (DK)

( * ) Notice: Subject to any disclaimer, the term of this patent is extended or adjusted under 35 U.S.C. 154(b) by 796 days.

(21) Appl. No.: 12/085,404

(22) PCT Filed: Nov. 23, 2006

(86) PCT No.: PCT/DK2006/000653
§ 371 (c)(1),
(2), (4) Date: Jun. 3, 2008

(87) PCT Pub. No.: WO2007/059773
PCT Pub. Date: May 31, 2007

(65) Prior Publication Data
US 2009/0272298 A1    Nov. 5, 2009

(30) Foreign Application Priority Data

Nov. 23, 2005 (DK) .................................. 2005 01645
Feb. 23, 2006 (DK) .................................. 2006 00261

(51) Int. Cl.
*C04B 14/22* (2006.01)
(52) U.S. Cl. ........................ 106/716; 106/644; 501/32
(58) Field of Classification Search ................ 106/716, 106/644; 501/32
See application file for complete search history.

(56) References Cited

U.S. PATENT DOCUMENTS

| 3,823,021 | A | * | 7/1974 | Jansen ......................... 106/716 |
| 3,915,917 | A | | 10/1975 | Weiant et al. |
| 4,116,703 | A | | 9/1978 | Stempin et al. |
| 4,622,184 | A | | 11/1986 | Barnhart et al. |
| 4,639,476 | A | | 1/1987 | Tajiri et al. |
| 6,296,699 | B1 | | 10/2001 | Jin |
| 6,303,223 | B1 | | 10/2001 | Kinose et al. |
| 6,743,287 | B2 | * | 6/2004 | Sunde ......................... 106/697 |
| 2002/0053304 | A1 | | 5/2002 | Pelot et al. |
| 2004/0122158 | A1 | | 6/2004 | Kuropka et al. |
| 2004/0251329 | A1 | | 12/2004 | Hsu et al. |
| 2005/0203239 | A1 | | 9/2005 | Shibahara et al. |

FOREIGN PATENT DOCUMENTS

| EP | 0024291 | 3/1981 |
| EP | 1422206 | 5/2004 |
| GB | 1283637 | 8/1972 |
| GB | 1474013 | 5/1977 |
| GB | 2117753 | 10/1983 |
| JP | 01/19508 | 1/2001 |
| KR | 1045071 | 6/2001 |
| WO | WO 94/19294 | 9/1994 |
| WO | WO 98/16483 | 4/1998 |
| WO | WO 01/18100 | 3/2001 |
| WO | WO 01/79131 | 10/2001 |

\* cited by examiner

*Primary Examiner* — Paul Marcantoni
(74) *Attorney, Agent, or Firm* — James Creighton Wray

(57) ABSTRACT

The use of pulverized glass having a particle size of 0 nm to 100 μm as an ingredient in a composite material, said composite material is obtained by mixing a base component and a hardener, is disclosed. The pulverized glass is useful in composite materials, such as either a cement-based material which is to be mixed with water as a hardener or in epoxies, acrylics, polyurethanes, butylenes or silicones.

17 Claims, No Drawings

USE OF PULVERIZED GLASS IN A COMPOSITE MATERIAL

This application claims the benefit of Danish Application No. PA 2005 01645 filed Nov. 23, 2005, Danish Application No. PA 2006 00261 filed Feb. 23, 2006, and PCT/DK2006/000653 filed Nov. 23, 2006, which are hereby incorporated by reference in their entirety.

The present invention relates to the use of pulverized glass as an ingredient in a composite material, said composite material being obtained by mixing a base component and a hardener. Furthermore, the present invention relates to a base component of such composite material, uses of such a base component for the production of products and products comprising such base component.

The base component may comprise cement, epoxies, acrylics, polyurethanes, butylenes or silicones. In order to obtain the composite material, the base material of the above kind is mixed with a hardener which is a compound conventionally used as a hardener with said base material.

Although composite materials comprising a base material, micro particles and aggregate have been known for the past 25 years or more, the characteristics of these materials have been improved over time. With the present invention, substantial improvements of the characteristics, durability and usability of the particular composite material, discussed below, have been realised.

In one aspect the present invention relates to the use of pulverized glass having a particle size of 0 nm to 100 μm as an ingredient in a composite material, said composite material is obtained by mixing a base component and a hardener; wherein preferably, the pulverized glass is included in the base component.

In a second aspect the present invention relates to a base component for use in a composite material comprising pulverized glass having a particle size of 0 nm to 100 μm, preferably 10 nm to 99 μm, such as 20 nm to 95 μm, such as 30 nm to 90 μm, e.g. 1 μm to 80 μm, for example 5 μm to 50 μm, such as 8 μm to 40 μm, e.g. 10 μm to 25 μm.

In a third aspect the present invention relates to the use of a base component comprising cement and pulverized glass for the production of products such as tiles, roof tiles, furniture or part of furniture, tabletops, steps for stairs, and other like products.

In a fourth aspect the present invention relates to a composite product comprising a base component comprising cement and pulverized glass as part of a composite material.

Finally, a fifth aspect according to the present invention relates to a composite product for use as a joint filler, said composite product comprising a base component comprising a conventional polyurethane base and pulverized glass having a particle size of 0 nm to 100 μM.

The pulverized glass has a particle size of 0 nm to 100 μM. Preferably, the pulverized glass has a particle size of 10 nm to 99 μm, such as 20 nm to 95 μm, such as 30 nm to 90 μm, e.g. 1 μm to 80 μm, for example 5 μm to 50 μm, such as 8 μm to 40 μm, e.g. 10 μm to 25 μm.

It should be noted that in the above expression, a particle size of 0 nm is to be construed as the particle size is not restricted to any lower limit. Accordingly, the particles may have any size below 100 μm.

In one preferred embodiment of the present invention the pulverized glass particles have a particle size distribution, wherein the most abundant particle sizes lies within the range of 0.1 μm to 0.4 μm.

Preferably the pulverized glass is comprised in the base component which is to be mixed with the hardener.

Although the present invention relates to use of pulverized glass having a particle size as an ingredient in a composite material, wherein said composite material is obtained by mixing a base component and a hardener, it should be noted that for some application the term "by mixing a base component and a hardener" may comprise situations wherein the base component is reacted with a hardener in form of oxygen or water/moist contained in the air. Hence, in such situations no hardener is "added" in the normal sense. Instead, the hardener adds itself by the taking up of air, oxygen, water and/or moist from the surroundings by the base.

In such situation the term "mixing" may be construed as simply "allowed to react".

Preferably the content of the pulverized glass is between 2 and 94 wt % of the base component. More preferred the content of the pulverized glass is included in an amount of 5 to 90 wt % of the base component, such as 10 to 80 wt %, 20 to 70 wt %, for example 30 to 60 wt %, such as 40 to 50 wt %.

Composite materials in the form of cement are recognised by their extremely high characteristic strength which in comparison to traditional cement based materials such as for example ordinary concrete reaches strength which is up to 6 times that of traditional concrete. The strength is attained by grading the particle sizes of the materials such that an optimum packing of the materials is achieved whereby extremely dense materials exhibiting extremely high strength characteristics may be achieved.

Other composite materials comprising elastic materials, such as acrylic, polyurethanes, butylenes or silicones or other like materials or hard materials, such as epoxy or gypsum are also contemplated as being encompassed within the family of composite materials within the scope of the present invention.

Traditionally, glass is considered to be a hydrophobic material but when pulverized such that the particle distribution of the pulverized glass is in the range 0 nm to 100 μm, the glass particles exhibit hygroscopic materials such that it is possible to use the pulverized glass in a mixture mentioned above where the pulverized glass in addition to being a passive ingredient also is active in that a very good dispersion of the pulverized glass in the matrix of the composite material is achieved, and furthermore that the pulverized glass particles to a certain extent exhibit binding properties such that the pulverized glass does contribute to the enhanced strength in the composite material.

One advantage of being able to use pulverized glass in a composite material of the type mentioned above is the fact that pulverized glass may be derived from glass products which otherwise would have to be deposited in landfills and for some certain types of glass in controlled landfills. This in turn implies that it is a costly exercise to get rid of glass which is not desirable anymore. Therefore, by being able to reuse the glass materials not only as filler but also as a contributor to the strength characteristics of the composite materials mentioned above, the pulverized glass thereby has gained a status as a valuable ingredient. Furthermore, glass is lighter such that by adding substantial amounts of glass, the composite material will provide an overall light construction.

As mentioned above, in an advantageous embodiment of the invention, the aggregated glass content of the composite material is between 2 and 94 wt % of the base component. In the mixtures of the composite material, where 94 wt % of the base component was pulverized glass, the integrity of the composite material was very high, and at the same time, the test subjects were extremely light due to the relatively lower density of glass in comparison to traditional aggregate materials.

In a further advantageous embodiment, the base component comprises a hydraulic binder of the white portland cement type and quartz sand having grains between 0.25 to 4 mm in addition to pulverized glass. Due to the white cement as well as the pulverized glass, the surface of products made from this particular composition of the base component of the composite material will have a light weight density but a dim, i.e. not shiny surface, which for a wide variety of applications is particularly desirable.

In a further advantageous embodiment, micro silica may be included, the micro silica having a particle grading size between 0.1 to 0.4 μm. Micro silica has the well documented properties which in addition to the binding properties of the cement and the glass provides for a composite material having a high internal integrity.

One particular mix recipe is used in order to create a preferred composite material where the material comprises:
- up to 400 kg/m³ portland cement;
- from 75 to 150 kg/m³ quartz sand between 0.25 to 1 mm;
- from 400 to 600 kg/m³ quartz sand between 1 to 4 mm;
- from 50 to 1100 kg/m³ pulverized glass between 0 nm to 100 μm;
- from 50 to 200 kg/m³ water;
- optionally from 0 to 3% fibres, preferably glass, polymer, steel, carbon or cellulose based fibres;
- optionally additives, such as plasticizers etc.

The fact that fibres may be added to the composite material as an option is desirable in uses where in addition to the light weight characteristics and the strength characteristics of the composite material, also ductility is an important factor. By adding fibres in up to 3% of the weight of the composite material, a very ductile material is achieved. The optional feature of adding additives may be performed in order to achieve the desired strength or the desired flowability of the composite material which again depends on the concrete project for which the composite material is to be used, i.e. the shape of the moulds and other considerations.

Due to the improved characteristics of the composite material according to the invention such as high strength, light weight and a very high resistance to acids, products manufactured by the composite material find use in a wide variety of different products. Therefore, the invention foresees the use of a composite material as disclosed above for the production of products such as tiles, roof tiles, furniture or potter furniture, table tops, steps for stairs, flooring elements and other like elements.

For test purposes, the composite material according to the invention has also been cast in application encompassing traditional concrete reinforcement with very good results. This in turn makes it possible to manufacture other objects which have hitherto been produced by traditional concrete.

In one particular mix, extremely good results were achieved where the mix was composed by

|  | Kg/m³ |
| --- | --- |
| Portland cement | 400 |
| quartz sand 0.25-1 mm | 90 |
| quartz sand 1-4 mm | 450 |
| dispersion additive (powder) | 36 |
| Water | 100 |
| Pulverized glass | 285 |

In the embodiment, wherein the base component is a cement-based material, the final product is obtained by mixing cement and the pulverized glass with water and half the optional additives, if present. Thereafter quartz sand having a particle size of 0.25-1 mm and quartz sand having a particle size of 1-4 mm is added. Finally the rest of the optional additives are added (if present) and the mixture is mixed for approximately 10 min., whereafter the mixture is formed into the desired shape of the final product.

The pulverized glass which in some embodiments is the main ingredient of the composite material was created by pulverizing second hand glass derived from window panes. The glass was placed in a drum mill in which drum mill a number of steal balls were present whereafter the mill was rotated such that the steal balls would crush the glass. Alternatively, the pulverized glass to be used in the present invention may be obtained by means of other grinding techniques, such as by use a an attritor system or by means of a roller edge apparatus.

When pulverized glass is added to the group of elastic materials, i.e. materials where the base material is acrylic, polyurethanes, butylenes or silicones or other like materials these materials acquire a greater workability, greater density, and as a consequence a larger contact surface. This is important as these materials when in contact with other materials will exhibit greater strength and bonding, whereby the service life of the materials, and possibly also the overall construction are greatly improved. Furthermore the glass content in the materials will substantially improve the material's resistance against detrimental influences in aggressive environments.

An example of an embodiment according to the present invention, wherein the base component is an elastic material, is a polyurethane joint filler.

Such a joint filler is manufactured by adding pulverized glass to a base conventionally used as base for such a joint filler. The pulverized glass is added under stirring of the mixture. The ratio starting polyurethane base:pulverized glass is 3.0-1.0.

After addition of pulverized glass has been completed mixing is continued until the mixture is homogenous. Finally the product is packed in a packing suitable for use for joint filler purposes.

For certain uses it is convenient to include a plasticizer in the form of one or more phthalates in the base component. Examples of useful, phthalates are bis(2-ethylhexyl)phthalate (DEHP), diisononyl phthalate bis(n-butyl)phthalate, butyl benzyl phthalate, diisodecyl phthalate, di-n-octyl phthalate, diethyl phthalate (DEP), diisobutyl phthalate (DIBP), di-n-hexyl phthalate. An example of a commercially available plasticizer which is useful in a base component according to the present invention is Desavin available from Bayer.

Also, due to the colloid interaction between the micro particles of the glass, extreme strength aspects may be achieved. Furthermore, the interaction may also be in the form of a very close and dense packing of the particles in the matrix, whereby a dense material with a large contact surface is achieved.

As already mentioned, pulverized glass is a waste product, and as such has a relatively low bulk cost, which therefore renders the products containing the pulverized glass less expensive, but for a number of applications improves the materials characteristics.

The invention claimed is:

1. A composite material comprising pulverized glass with a particle size less than 100 microns, wherein the most abundant particles of pulverized glass are in the range of 0.1 micron to 0.4 microns and a base component selected from the group consisting of hydraulic cement, epoxy, acrylic, polyurethane, butylene, or silicone; and water if the base component is hydraulic cement.

2. The composite material according to claim 1, wherein the pulverized glass particles comprises between 2 to 94 wt % of the composite material.

3. The composite material according to claim 1, wherein the hydraulic cement is Portland cement.

4. The composite material according to claim 1, further comprising quartz sands of particle size of 0.25 to 4 mm and/or microsilica of particle size 0.1 to 0.4 microns.

5. The composite material according to claim 1, wherein the base component is polyurethane.

6. The composite material according to claim 1, further comprising fibers.

7. The composite material according to claim 1, wherein the fibers are glass, polymer, steel, carbon, or cellulose containing fibers.

8. A composite mix for use in manufacturing a composite according to claim 1, wherein the base component comprises:
- greater than 0 kg/m3 to 400 kg/m3 Portland cement;
- 75 to 150 kg/m3 quartz sand of particle size 0.25 to 1 mm;
- 400 to 600 kg/m3 quartz sand of particle size 1 to 4 mm;
- 50 to 1100 kg/m3 pulverized glass of particle size less than 100 microns;
- optionally less than or equal to 35 kg/m3 fibers; and
- optionally plasticizers.

9. A composite mix according to claim 8, wherein the fibers are selected from the group consisting of glass, polymer, steel, carbon, or cellulose containing fibers.

10. A method of making a composite material comprising mixing pulverized glass as a base component having a particle size less than 100 microns and a base component selected from the group consisting of hydraulic cement, epoxy, acrylic, polyurethane, butylene, or silicone; and water if the base component is hydraulic cement.

11. A composite mix for use in manufacturing a composite material comprising pulverized glass with a particle size less than 100 microns, wherein the most abundant particles of pulverized glass are in the range of 0.1 micron to 0.4 microns and a base component selected from the group consisting of hydraulic cement, epoxy, acrylic, polyurethane, butylene, or silicone; and water if the base component is hydraulic cement.

12. The composite mix according to claim 11, wherein the pulverized glass particles comprises between 2 to 94 wt % of the composite material.

13. The composite mix according to claim 11, wherein the hydraulic cement is Portland cement.

14. The composite mix according to claim 11, further comprising quartz sands of particle size of 0.25 to 4 mm and/or microsilica of particle size 0.1 to 0.4 microns.

15. The composite mix according to claim 11, wherein the base component is polyurethane.

16. The composite mix according to claim 11, further comprising fibers.

17. The composite mix according to claim 11, wherein the fibers are glass, polymer, steel, carbon, or cellulose containing fibers.

* * * * *